United States Patent Office 2,942,984
Patented June 28, 1960

2,942,984
EDIBLE FATS AND PROCESS OF MAKING SAME

Heinrich Wissebach, Emmerich, Germany, assignor to Lever Brothers Company, New York, N.Y., a corporation of Maine No Drawing. Filed Apr. 15, 1957, Ser. No. 652,661

Claims priority, application Great Britain Apr. 17, 1956

11 Claims. (Cl. 99—118)

This invention relates to edible fats, to their preparation, and to products containing them.

According to the present invention it has now been found that liquid fractions, obtained by fractional crystallisation from natural oils and fats, may be transformed by hydrogenation with an appropriate catalyst into low melting hard fats. Preferably the liquid fractions should contain a high proportion of palmito-diolein or stearo-diolein, particularly good results being obtained when the total amount of these dioleins is as high as about 70% of the glyceride mixture.

The hard fats thus obtained, owing to their property of being comparatively hard only a few degrees below their melting point, are particularly useful as an ingredient in the manufacture of couvertures and fillings for biscuits, cakes and confectionery. The fats may be useful as substitutes for cocoa-butter for such purposes and may be used in admixture with cocoa-butter.

The invention further comprises a process for the preparation of speciality hard fats from vegetable and animal oils and fats in which a liquid fraction is separated by fractional crystallisation as is described, for instance, in our copending application No. 565,758, the liquid fraction being subsequently hydrogenated under conditions favouring the formation of iso-oleic acids until the desired softening point is obtained.

Many vegetable and animal oils and fats including palm oil, Shea butter, lard, beef tallow and mutton tallow can be used as starting materials but palm oil is highly preferred.

The present invention provides a process for the preparation of a hard fat which comprises fractionally crystallising an animal or vegetable oil or fat to obtain a liquid fraction therefrom and hydrogenating the liquid fraction to provide a fat having an iodine value in the range 50–65, a softening point in the range of about 30° C. to about 45° C. and a dilatation at 20° C. of not less than 1200.

Preferably the hydrogenated fat has an iodine value of 58–62, a softening point in the range of about 34° C. to about 38° C. and a dilatation at 20° C. of not less than 1400.

The present invention further comprises a process of preparing products in which cocoa-butter is normally incorporated in which process a fat obtained according to the invention is used in place of part or all of the cocoa-butter.

The fractions can be mixed with cocoa-butter prior to incorporation in products in which cocoa-butter is normally incorporated and the invention also includes mixtures of cocoa-butter and a fraction having the desired characteristics.

The minimum dilatation at 20° C. which the fractions according to the invention should preferably possess, depends on the quality of the product and the degree of of replacement of cocoa-butter by the fraction.

When use as a substitute for 75%–100% of the cocoa-butter normally added to the product the dilatation at 20° C. of the fractions should be at least 1400, preferably at least 1500 and the softening point not over 37° C. When the fractions are used in small proportions in admixture with cocoa-butter, for example 25% of the total fat, useful results can be obtained when the dilatation at 20° C. is at least 1600 and the softening point not cover 42° C. Because of the relative cost of cocoa-butter and the substitute according to the invention a substitution of even 5% of the cocoa-butter by a fraction is useful and at such a proportion the softening point of the substitute may be even higher than 43° C.

The most widely useful fractions are those having a dilatation at 20° C. of at least 1400 and preferably at least 1500 with an iodine value in the range of 55 to 65, after hydrogenation, and a softening point between 35° C. and 40° C.

The fractionation of the animal or vegetable oil or fat may be carried out by fractional crystallisation from a solvent. A single crystallisation may suffice but two or more crystallisations can be used. Substantially anhydrous acetone is the preferred solvent, but other solvents for example, substantially anhydrous ether, may also be used.

If a single crystallisation is employed, an amount of acetone between 3 to 10 mls. per gram of fat can be used. This amount of acetone can be reduced if the number of crystallisations is increased or if a large number of washers is used. The temperature of crystallisation depends on the conditions used, in particular the solvent ratio. With ratios of the order given, temperatures of from about —3° C. to about 6° C. may be used.

Various cooling procedures may be used. The oil may be dissolved in acetone at 15° C. or higher and then the solution cooled to the desired temperature, preferably with stirring. An alternative procedure is to mix cold acetone with hot oil, the temperatures being such that the mixture is at the desired crystallisation temperature.

It may also be possible to obtain the desired liquid fractions, for instance from palm oil, without use of a solvent.

In the melting of fats a characteristic change of volume is observed which, especially in the case of fats solid at the normal temperature, manifests itself in a sudden increase in the volume.

The dilatation or isothermal melting expansion of a fat is the volume increase, which is expressed in mm.$^3$, determined under the conditions of the following procedure and referred to 25 g., the reference temperature being given.

The dilatometer is of glass and consists of a vertical graduated capillary tube joined at its lower end by a U-shaped capillary tube to a glass bulb surmounted by a neck which is internally ground to take a hollow ground glass stopper. The height (above the lowest point of the U-shaped capillary) of the top of the graduated tube and the top of the mouth of the bulb are 350 mm. and 70 mm., respectively. The graduations extend over a length of 250 to 290 mm., and start 1 cm. from the upper end of the tube. The graduations are marked in intervals of 5 mm.$^3$ (accurately calibrated) and cover a total volume of 900 mm.$^3$. The internal diameter of the bulb is 20 mm. and it has a volume of 7 ml. (tolerance±0.5 ml.). The internally ground neck of the bulb tapers downwardly from an internal diameter of 15 mm. to an internal diameter of 12 mm. and is 26 mm. long. The bulb of the instrument is thus below the level of the graduations on the capillary tubing. The stopper to be inserted in the mouth of the bulb is about 95 mm. in length (including the ground portion), and is hollow and is partly filled with lead shot to hold it firmly in position while a dilatation is being determined.

1.5 ml. of well boiled distilled water containing a little blue ink is pipetted into the bulb of the dilatometer. The dilatometer is then weighed. A sample of the fat to be examined is thoroughly de-gassed by heating at 100° C. under vacuum. The fat (at about 60° C.) is then poured into the bulb of the dilatometer and the ground glass stopper is inserted, care being taken not to include any air. The amount of fat added is such that, during the determination, the level of water never falls below the lowest of the graduations and never rises above the top of the graduations. If the initial water level on filling is about two-thirds of the height of the graduated capillary, these conditions are usually fulfilled. The dilatometer is re-weighed to obtain the weight of fat added. The hollow stopper is then partly filled with lead shot. It is then placed in a water bath maintained at 60° C. ($\pm 0.1°$) and a reading of the level of the water in the capillary is made. This is the "base reading," $R_{60}$.

The filled dilatometer is chilled in an ice water bath for 1½ hours. It is then allowed to warm in an air bath at 26° C., at which temperature it is maintained for 40 hours. It is then again chilled in an ice water bath for 1½ hours and then placed in a water bath at 20° C. ($\pm 0.1°$ C.), the dilatometer being immersed to such a depth that the water level is above the middle of the ground glass stopper.

The position of the water meniscus in the capillary is read every half hour until two successive readings differ from by no more than 2 mm.³. The final reading ($R_t$) is used in the calculations.

A similar procedure is adopted for each temperature $t$ at which the dilatation is required. Thus, $R_{20}$, $R_{25}$, $R_{30}$ and $R_{35}$ are successively determined.

Finally the dilatometer is heated again to 60° C. and the "base reading" is re-determined. If the initial and final "base reading" differ by more than 2 mm.³ the whole operation must be repeated.

THE CALCULATION

The value of the dilatation is calculated from the following formula:

$$D_t = \frac{25(R_{60} - R_t)}{W} - A$$

where:

$D_t$ = dilatation at $t°$ C.
$W$ = weight of fat taken
$R_{60}$ = base reading (mm.³)
$R_t$ = reading of the capillary at $t°$ C. (mm.³), and
$A$ is given in the table below

| $t°$ C. | A |
| --- | --- |
| 20 | 880 |
| 25 | 770 |
| 30 | 665 |
| 35 | 555 |

The softening point is determined, after stabilizing the fat, by a modification of the method published by Barnicoat in "The Analyst," 69, pages 176–178. In this modified method 0.5 ml. of mercury is placed in a lipped 6 x 1 cm. test tube and the tube and contents chilled for 5 minutes in crushed ice and water. 1 ml. of fat melted at 100° C. is poured on the mercury and the filled tube allowed to stand in ice and water for 90 minutes. A ⅛" diameter ball-bearing is placed in the depression in the fat surface which forms when the fat is cooled. The fat in the tube is then stabilized in the same manner as described for the dilatometer allowing the temperature to rise gradually to 26° C. or 28.5° C. and keeping it at 26° C. or 28.5° C. for 40 hours. The tube is then attached to a thermometer graduated in 1/10 of a degree so that the fat column is on a level with the thermometer bulb. This is conveniently done by attaching a metal plate to the thermometer, the plate having several holes in which a tube or tubes may be suspended by the lip or lips. The thermometer and tube or tubes are immersed in a water bath equipped for stirring so that the tube or tubes are immersed to a depth of 4.5 cms. The determination is commenced with the water bath at 20° C., at which temperature it is maintained for 20 minutes. The temperature of the water bath is then raised at the rate of 0.5° C. per minute whilst stirring vigorously. The temperature when the steel ball has fallen half way through the fat column is recorded as the softening point.

The following examples illustrate the invention:

Example I 1000 kg. refined and deodorized palm oil were mixed with 3000 l. of acetone and the mixture warmed until a clear solution was obtained (35° C.). The solution was allowed to cool down to 25° C. with stirring and kept at this temperature for 20 minutes. Then it was filtered and pressed on the filter. The filtrate was then cooled to 4.5° C. with constant stirring and kept at this temperature for 10 minutes. After filtration, the acetone was distilled off from the filtrate. A liquid fraction (having a softening point of +7° C. and an iodine value of 70) was thus obtained. This fraction was hydrogenated in the presence of a nickel catalyst until its softening point was 37.4° C. The fat thus obtained had an iodine value of 60 and a dilatation at 20° C. of 1505.

This product was useful as a substitute for cocoabutter in the preparation of couvertures for confectionery and in pharmaceutical products.

Example II

Shea fat was fractionally crystallized under the same conditions as used in Example I. The liquid fraction obtained (iodine value 68, softening point +6° C.) was hydrogenated in the presence of a nickel catalyst until its softening point was 37.5° C. This product had an iodine value of 59.0 and a dilatation at 20° C. of 1440.

This fat was useful as a substitute for cocoabutter in the preparation of filled confectionery products.

Example III

Lard was fractionally crystallized in the same manner as described in Example I, the temperatures to which the solution was cooled subsequently being 20° C. and 2° C. The liquid fraction thus obtained (iodine value 77.5 and softening point +8° C.) was hydrogenated at 190° C. in the presence of a nickel catalyst until its softening point was 38.5° C. This product had an iodine value of 62.0 and a dilatation at 20° C. of 1485.

Example IV

The product of Example I was used as a cocoabutter substitute in a glaze-composition, made according to the formula:

375 kg. of substitute
275 kg. of cocoabutter
340 kg. of sugar
10 kg. of soybean lecithin.

These substances were mixed for two hours in an edge-runner mixer and then, to effect a further homogenization, in a three-roll homogenizer. It was kept for eight hours at a temperature of 65° C. in a conch. After keeping this mixture undisturbed for several hours, it was finally passed over a roller cooler, after which the mass was filled off in containers at a temperature of about 35° C. The solidified couverture is hard and melts easily in the mouth. It possesses a glossy surface and remains, even when kept for some months, free from fat-bloom and a soapy taste.

Example V

Refined and deodorized palm oil was melted and cooled to 30° C. It was kept at that temperature for 12 hours after which the crystals formed were separated from the liquid fraction. The liquid fraction thus obtained has a softening point of 10° C. and an iodine value of 60.0. 500 g. of this liquid fraction was dissolved in 1400 ml. of acetone and then cooled for 5 hours at a temperature of 2° C. 165 g. of an oil having a softening point of 8° C. and an iodine value of 82.5 was obtained from the filtrate. This fraction was hydrogenated to a softening point of 37° C. The final product had an iodine value of 59.0 and a dilatation at 20° C. of 1400.

I claim:
1. A process for the preparation of an edible fat which comprises fractionally crystallizing a natural fat selected from the group consisting of palm oil, Shea butter, lard, beef tallow and mutton tallow to obtain a liquid fraction having a softening point below about 30° C. therefrom and hydrogenating the liquid fraction so as to provide a fat having an iodine value in the range 50 to 65, a softening point in the range of about 30° C. to about 45° C. and a dilatation at 20° C. of not less than 1200.

2. A process according to claim 1 in which fractional crystallisation is carried out from substantially anhydrous acetone.

3. A process according to claim 1 in which fractional crystallisation is carried out without use of a solvent.

4. A process according to claim 1 in which hydrogenation of the liquid fraction is carried out under conditions which promote the formation of iso-oleic acids.

5. A process for the preparation of an edible fat which comprises fractionally crystallising a natural fat selected from the group consisting of palm oil, Shea butter, lard, beef tallow and mutton tallow to obtain a liquid fraction having a softening point below about 30° C. therefrom and hydrogenating the liquid fraction so as to provide a fat having an iodine value in the range 58 to 62, a softening point in the range of about 34° C. to about 38° C. and a dilatation at 20° C. of not less than 1400.

6. A process for the preparation of an edible fat which comprises fractionally crystallising a natural fat selected from the group consisting of palm oil, Shea butter, lard, beef tallow and mutton tallow to obtain a liquid fraction having a softening point below about 30° C. therefrom and hydrogenating the liquid fraction so as to provide a fat having an iodine value in the range 55 to 65, a softening point in the range of about 35° C. to about 40° C. and a dilatation at 20° C. of not less than 1500.

7. A process for the preparation of an edible fat which comprises fractionally crystallising palm oil without use of a solvent to obtain a liquid fraction having a softening point below about 30° C. therefrom and hydrogenating the liquid fraction so as to provide a fat having an iodine value in the range 58 to 62, a softening point in the range of about 34° C. to about 38° C. and a dilatation at 20° C. of not less than 1400.

8. A fat composition consisting essentially of a mixture of cocoa-butter and an edible fat obtained by fractionally crystallising a natural fat selected from the group consisting of palm oil, Shea butter, lard, beef tallow and mutton tallow so as to obtain a liquid fraction having a softening point below about 30° C. therefrom, hydrogenating the liquid fraction so as to provide a fat having an iodine value in the range 58 to 62, a softening point in the range of about 34° C. to about 38° C. and a dilatation at 20° C. of not less than 1400, the cocoa-butter amounting to from 25 to 75% by weight of said mixture.

9. A fat composition consisting essentially of an edible fat obtained by fractionally crystallising a natural fat selected from the group consisting of palm oil, Shea butter, lard, beef tallow and mutton tallow so as to obtain a liquid fraction having a softening point below about 30° C. therefrom and hydrogenating the liquid fraction so as to provide a fat having an iodine value in the range 50 to 65, a softening point in the range of about 30° C. to about 45° C. and a dilatation at 20° C. of not less than 1200.

10. A confectionery product of the class consisting of fat-based couvertures and fillings for cakes and biscuits comprising an edible fat obtained by fractionally crystallizing a natural fat selected from the group consisting of palm oil, Shea butter, lard, beef tallow and mutton tallow so as to obtain a liquid fraction having a softening point below about 30° C. therefrom, hydrogenating the liquid fraction so as to provide a fat having an iodine value in the range of 50 to 65, a softening point in the range of about 30° C. to about 45° C., and a dilatation at 20° C. of not less than 1200, said edible fat being present at a level of at least 25% by weight of the total fat content of the product.

11. A confectionery product according to claim 10 which further comprises cocoa-butter at a level of at least 25% based on the total weight of the fat in said product.

References Cited in the file of this patent
UNITED STATES PATENTS

| | | |
|---|---|---|
| 2,287,838 | Stanley | June 30, 1942 |
| 2,586,615 | Cross | Feb. 19, 1952 |
| 2,619,421 | Greenfield | Nov. 25, 1952 |
| 2,657,995 | Blum | Nov. 3, 1953 |

FOREIGN PATENTS

| | | |
|---|---|---|
| 582,557 | Great Britain | Nov. 20, 1946 |
| 590,916 | Great Britain | July 31, 1947 |

OTHER REFERENCES

Kraemer et al.: Oil and Soap, November 1943, pp. 235 to 240.